April 7, 1931. H. J. MURPHY 1,799,433
LUBRICATING APPARATUS
Filed Aug. 25, 1925
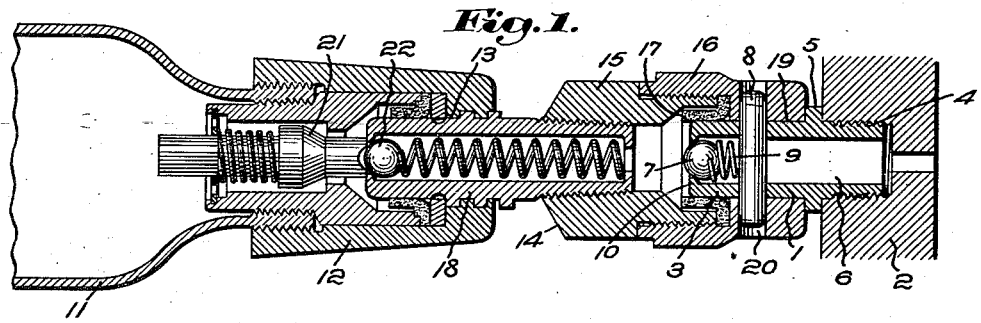
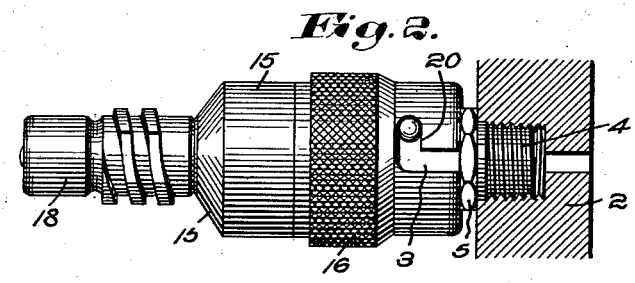
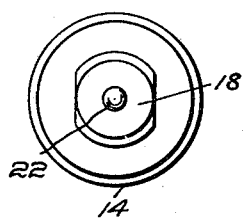 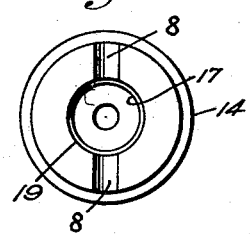
Inventor:
Howard J. Murphy,
by Emery Booth Janney Varney
Attys.

Patented Apr. 7, 1931

1,799,433

UNITED STATES PATENT OFFICE

HOWARD J. MURPHY, OF READING, MASSACHUSETTS, ASSIGNOR, BY MESNE ASSIGNMENTS, TO ALEMITE CORPORATION, OF CHICAGO, ILLINOIS, A CORPORATION OF DELAWARE

LUBRICATING APPARATUS

Application filed August 25, 1925. Serial No. 52,402.

This invention aims to provide an improved adapter for use in connection with lubricating apparatus.

In the drawings, which illustrate a preferred embodiment of my invention:—

Fig. 1 is a section showing a portion of a bearing, a nipple secured thereto, a portion of a lubricant expelling device and the adapter for securing the lubricant expelling device to the nipple;

Fig. 2 is an elevation view of the adapter connected to the nipple to which lubricant is to be supplied; and Figs. 3 and 4 are end views of the adapter.

Referring to the drawings, I have shown an adapter for use in connecting a lubricant gun, or like lubricant supply device, to a nipple which is not intended to receive the gun which is to be used.

The nipple 1 which is secured to the bearing 2 includes a body portion comprising a smooth cylindrical portion 3, a screw threaded portion 4 for the threaded engagement with a bearing and a central hexagonal portion 5. The nipple is also provided with a central passage 6, a ball check 7 at the inlet end of the passage, a pin 8 passing through the nipple and projecting beyond the cylindrical portion at opposite sides and also intersecting the passage 6 and a spring 9, seated at one end against the ball-check 7 and at the other end against the pin, for holding the ball against a valve seat 10 to close the the passage 6, as best illustrated in Fig. 1.

The lubricant gun 11, only part of which is shown in the drawings, is substantially the same as shown and described in my application, Serial No. 8,587 now Patent Number 1,763,062 granted June 10, 1930. This gun is provided, as illustrated, with a nozzle 12 having internal screw threads 13 and therefore cannot be directly secured to the nipple 1 to supply lubricant to the bearing 2, so I have provided an adapter 14 which may be connected between the gun 11 and the nipple 1 to permit lubricant to be forced from the gun 11 to the nipple 1.

The adapter 14 includes a body portion 15, a coupling sleeve or nozzle 16 threadedly connected to one end of the body portion, a hat leather 17, or other suitable packing, held between the body portion and the nozzle and a nipple 18, of the type described and illustrated in my application, Serial No. 8,586, now Patent Number 1,651,218 granted Nov. 29, 1927, threaded into the other end of the body portion, as shown in Figs. 1 and 2. An aperture 19 is provided in the nozzle 16 to receive the smooth cylindrical portion 3 of the nipple 1 and bayonet slots 20 are cut in the wall surrounding the aperture 19 to receive the pin 8.

In operation the adapter may first be secured to the nipple 1 by coupling the nozzle 16 with the nipple 1, as shown in Fig. 2. Then the nozzle 12 of the gun 11 may be threaded into engagement with the nipple 18, thereby opening the closure valve 21 in the discharge end of the gun to permit passage of lubricant from the barrel of the gun past the ball-check 22 in the nipple 18, through the adapter and past the ball-check 7 in the nipple 1 to the bearing 2.

When sufficient lubricant has been forced under pressure to the bearing 2, the gun may first be entirely disconnected from the nipple 18, or at least turned sufficiently relative thereto to permit the valve 21 to close. Then the adapter may be disconnected from the nipple 1 and connected successively to other nipples, in the manner above described, to lubricate the bearings to which they may be connected. It is important to close the valve 21 before the adapter is disconnected from the nipple 1, so that lubricant cannot flow from the adapter during the time it is disconnected from one nipple and connected to another.

While I have shown and described a preferred embodiment of my invention, it will be understood that changes involving omission, substitution, alteration and reversal of parts and even changes in the mode of operation may be made without departing from the scope of my invention, which is best defined in the appending claims.

Claims:

1. An adapter for lubricating apparatus comprising, in combination, a rigid body part, a quick detachable nozzle secured to one end of said body part, bayonet slot means in said nozzle for engagement with a pin of a lubricant receiving nipple secured to a bearing to be lubricated, said engagement being effected by rotation of said bayonet slot means about its axis, a hat-washer secured between said body and said nozzle for providing a lubricant tight seal against the nipple when said nozzle is secured thereto and a lubricant receiving nipple secured to the other end of said body part, said nipple presenting male coupling threads for engagement with female threads of the nozzle of a lubricant supply device, said engagement being effected by rotation of said nozzle about its axis in the same direction as used in effecting the engagement of the bayonet slot means.

2. A unitary rigid adapter for connecting a lubricant expelling device to a nipple not intended for cooperative engagement therewith, said adapter comprising a coupling presenting female coupling means for coupling engagement with male coupling means presented by a nipple secured to a bearing to be lubricated, a hat washer for engagement with said nipple to provide a lubricant tight seal, and a nipple presenting a plurality of relatively wide male threads for cooperative engagement with female threads of the nozzle of a lubricant supply device, said adapter having a continuous straight and substantially unobstructed bore with an outwardly opening check valve therein, and the engagement of said coupling and nipple being effected by rotation of the said coupling in the direction of the threads on said threaded nipple.

3. In combination with a lubricant compressor, a discharge nozzle connected therewith, a valve in said nozzle, and means for holding said valve open comprising a connecting member having means for making a sealed connection with said nozzle and means for opening said valve, and means rigid with said member for making a quick detachable connection with a lubricant receiving fitting.

4. A device for high pressure lubrication comprising a rigid body member internally threaded at one end and externally threaded at the other end thereof, a lubricant receiving fitting having means for making a quick detachable connection with a source of lubricant under pressure secured in said internally threaded end, a nozzle member having means for making a quick detachable mechanical connection with a lubricant receiving fitting and secured over the externally threaded end of said body, and a pliable hat washer clamped between said last named end of said body and said nozzle and having its central portion adapted to seal against the end portion of a lubricant receiving fitting inserted in said nozzle.

In testimony whereof, I have signed my name to this specification.

HOWARD J. MURPHY.